United States Patent
Fraleigh

[15] 3,654,730
[45] Apr. 11, 1972

[54] FLEXIBLE BARRIER

[72] Inventor: Alton L. Fraleigh, 7 Toilsome Ave., Norwalk, Conn. 06841

[22] Filed: Jan. 26, 1971

[21] Appl. No.: 109,853

[52] U.S. Cl. ...................................49/34, 160/40, 160/201, 161/100
[51] Int. Cl. .........................................E06b 1/70, E06b 7/00
[58] Field of Search....................49/1, 34, 9, 197, 469, 489, 49/474, 475; 160/40, 201; 161/100, 406, 167

[56] References Cited

UNITED STATES PATENTS

| | | | |
|---|---|---|---|
| 2,572,154 | 10/1951 | Howard | 49/467 |
| 2,612,947 | 10/1952 | Jenks | 160/40 |
| 2,820,516 | 1/1958 | Cookson et al. | 160/40 |
| 3,156,293 | 11/1964 | Reynolds | 160/40 |
| 3,535,824 | 10/1970 | Kessler | 49/489 |

*Primary Examiner*—Willard E. Hoag
*Attorney*—Johnson & Kline

[57] ABSTRACT

A flexible barrier to be extended across the bottom portion of an opening, for example the door opening in a garage, to intercept foreign matter, such as leaves, snow or dirt. The barrier is preferably formed of elastomeric material and has a broad base to be secured to the floor of the garage and has a flexible wall projecting upwardly from the base in position to engage and prevent said foreign matter from entering the garage, said wall being deflectable to permit a heavy object, such as an automobile, lawn mower, work cart or the like, to pass thereover on entering or leaving the garage without interference and will then return to normal position. The wall can be provided with vertical slits to increase the flexibility thereof and can have a laterally disposed lip or deflector portion extending from the upper edge thereof to intercept the foreign material and deflect it back out through said opening.

8 Claims, 4 Drawing Figures

PATENTED APR 11 1972 3,654,730

INVENTOR.
Alton L. Fraleigh
BY
Johnson and Kline
ATTORNEYS

FLEXIBLE BARRIER

Heretofore there has been a problem of undesired foreign matter or material being blown along the ground and entering a structure through an unclosed opening and causing an undesired litter within the structure. This has been particularly true of garages when the door is left open after the automobile has been removed.

The present invention overcomes this problem by providing a flexible barrier secured to the floor of the structure or garage adjacent the door to extend across the opening to intercept and/or deflect foreign matter that might pass along the ground and through said opening.

The flexible barrier, preferably made of elastomeric material, comprises a base portion adapted to be secured to the ground and provided with an upwardly projecting flexible wall to engage and intercept said foreign matter such as leaves, grass clippings, snow and dirt or the like as might blow along the ground and through said opening and collect in the garage.

The wall, being flexible, will deflect to permit a heavy object, such an automobile, lawn mower or work cart or the like, to pass thereover on entering or leaving the garage without interference and will thereafter return to normal position. If desired, the wall can be provided with vertical slits to increase the flexibility thereof.

The wall can be provided on its upper free edge with a laterally extending lip or deflector portion projecting forwardly to engage and direct or deflect the foreign material back in the opposite direction.

If desired, the barrier can be made in sections and disposed in end-to-end relation to extend across said opening, said barrier being secured in position by any suitable means, such as adhesive or by a hold-down bar overlying said base and secured to the floor.

Other features and advantages of the invention will be apparent from the specification and claims when considered in connection with the accompanying drawings in which:

Figure 1:
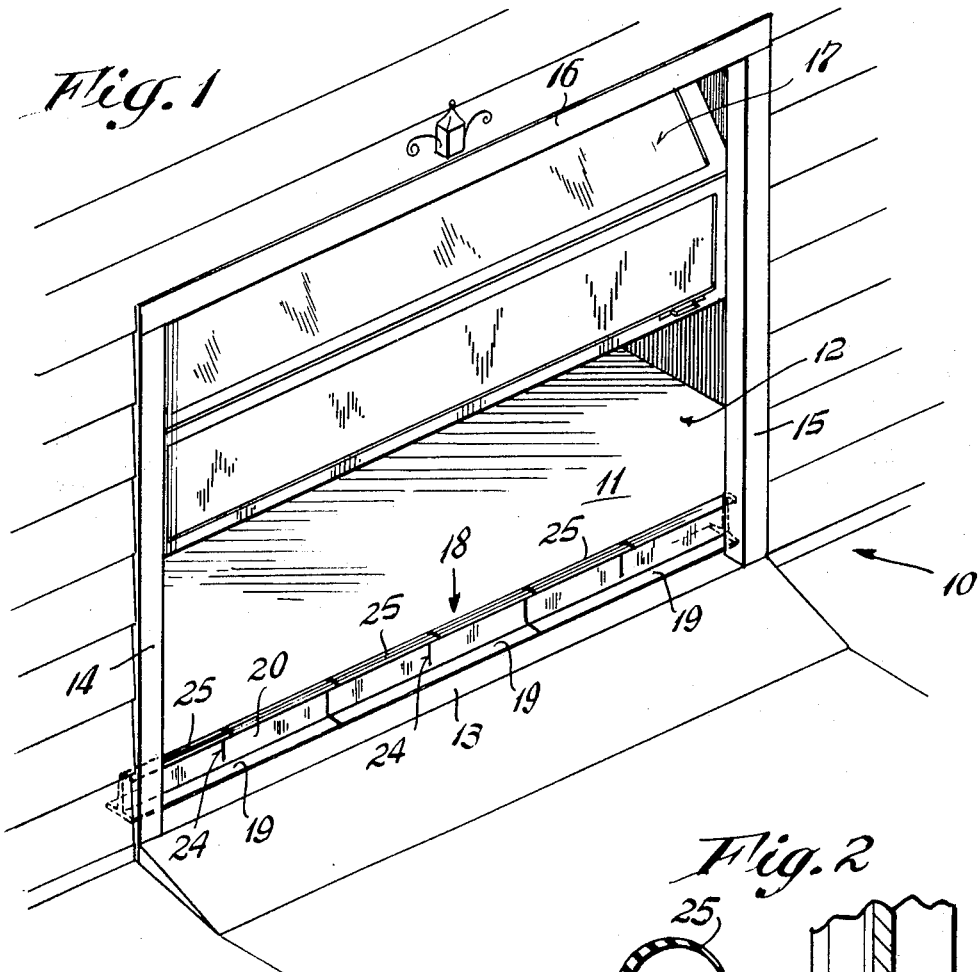
FIG. 1 is a perspective view showing the flexible barrier in position across a door opening in a garage.

While a barrier of the present invention can be used in various structures having an opening therein, in the illustrated form of the invention the barrier is shown in FIG. 1 in position within a structure such as a garage 10 having a floor 11, a door opening 12 consisting of a bottom portion 13, side portions 14, 15 and a top portion 16. The opening is closed by a usual overhead sliding door 17.

Figure 2:
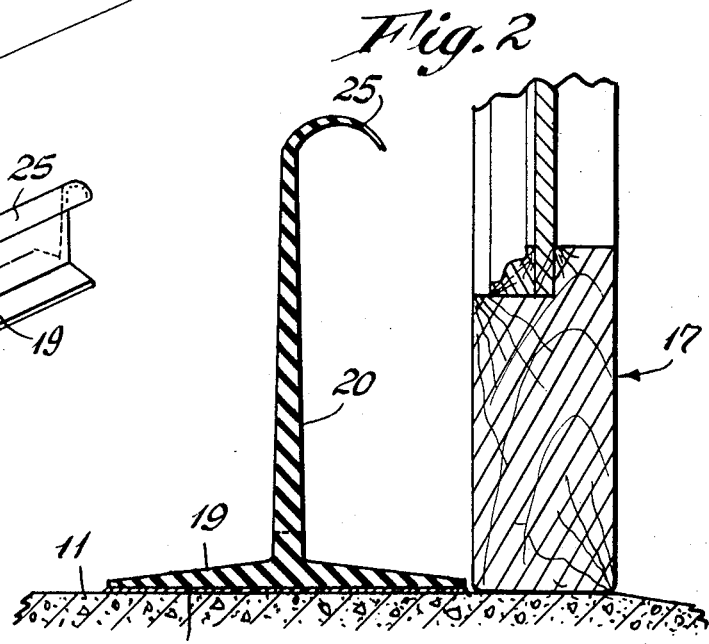
FIG. 2 is a transverse section showing the barrier of FIG. 1 and its relation to the door.

A flexible barrier 18 of the present invention is mounted on the floor 11 adjacent the door 17 to extend side to side of the opening as shown in FIGS. 1 and 2. The barrier 18 comprises a relatively broad base 19 and has a flexible wall 20, preferably integral therewith, projecting upwardly from the base, as shown, a sufficient distance to engage and prevent foreign matter moving along the ground from entering the garage.

Figure 4:
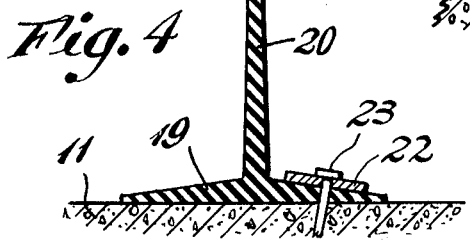
FIG. 4 is a transverse section of the barrier with a hold-down bar.

The base is adapted to be secured to the floor 11 or ground by a suitable adhesive layer 21, as shown in FIG. 2 or by a hold-down bar 22 overlying the base and fasteners 23, as shown in FIG. 4.

According to the present invention the flexible wall of the barrier is deflectable so that a heavy object, such as an automobile, lawn mower, work cart or the like can pass thereover on entering or leaving the garage without interference and the wall thereafter will return to normal position. If desired, the wall can be provided at spaced intervals with vertically extending slits 24 which increase the deflectability of portions of the wall under heavy objects.

In the preferred form of the invention the wall 20 is provided with a laterally disposed lip or deflector portion 25 extending forwardly from the upper free edge to intercept the foreign matter and cause it to be directed back out through the opening. If desired, the lip can be curved, as indicated, to enhance its operation in intercepting and directing the flow of the foreign matter.

For example, in the preferred form of the invention the base 19 can be 5 inches wide from edge to edge, the wall 20 can be about 6 inches high and the lip 25 can be 1-¼ inch long. Such a barrier has been found to effectively prevent foreign material, such as leaves, grass clippings, snow and dirt, from entering the garage and forming an unwanted accumulation of such material, requiring frequent cleaning of said material from the garage.

The barrier is preferably formed from flexible elastomeric material (rubber, synthetic rubber such as neoprene or a butadiene-styrene copolymer, and suitable thermoplastic polymers, such as polyethylene, polyurethane, polyvinyl chlorides, nylon or the like) which is capable of flexing as required and will withstand weather.

Figure 3:
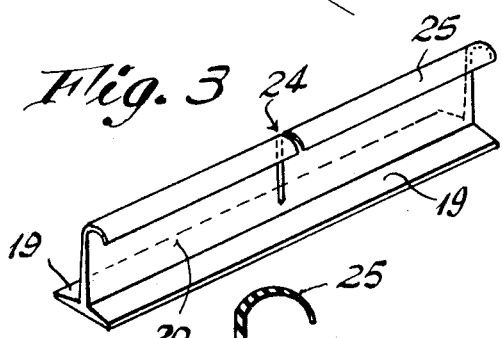
FIG. 3 is a perspective view of a barrier section.

Although the barrier may be made in one piece long enough to extend from side to side of the opening, in the preferred form of the invention it is made in short sections, as shown in FIG. 3, which are more readily handled, stored and shipped, said sections being easily laid and secured in end-to-end relation across the opening. As shown in FIG. 1, three such sections are illustrated to provide an effective flexible barrier to the passage of undesired material through the door opening 12.

Variations and modifications may be made within the scope of the claims and portions of the improvements may be used without others.

I claim:

1. A flexible barrier comprising: an elongated base member having an elongated, thin wall member attached thereto, said wall member having a portion thereof, remote from said base permanently curved about an axis substantially parallel to a line formed by intersection of said wall member and said base said barrier being adapted to be mounted across an opening of a building and to being attached to a floor thereof, said wall member being of sufficient height when installed to extend a substantial distance above the base and to intercept blown leaves, said flexible wall member also being adapted to deflect when a heavy object passes thereover and to regain its original position when said heavy object has passed.

2. The invention as defined in claim 1 wherein said wall has spaced, upwardly extending slits therein to increase the flexibility of the barrier.

3. The invention as defined in claim 1 wherein the flexible wall is made of an elastomeric material.

4. The invention as defined in claim 1 wherein the base and flexible wall are integral.

5. A building provided with a flexible barrier across the lower portion of a doorway, said barrier being adapted to intercept blown leaves, said building comprising: a doorway having a door and a floor adjacent said doorway, a flexible barrier member mounted on said floor across said doorway and, spaced from said door, said barrier member having an elongated base member and an elongated wall member attached to said base, said wall member having a portion thereof, remote from said base, curved about an axis substantially parallel to a line formed by intersection of said wall member and said base member, said barrier being adapted to deflect when a heavy object passes thereover and to regain its original position when said heavy object has passed, said wall member having sufficient height to overlap the lower portion of said door when said door is closed and to intercept blown leaves when said door it open.

6. The invention as defined in claim 5 wherein said base is secured to said floor by adhesive.

7. The invention as defined in claim 5 wherein said base is secured to said floor by a hold-down bar.

8. The invention as defined in claim 5 wherein said flexible barrier comprises a plurality of sections disposed in end-to-end relation to extend from side to side of said opening.

* * * * *